(12) United States Patent
Rockwood et al.

(10) Patent No.: US 7,656,801 B1
(45) Date of Patent: Feb. 2, 2010

(54) SELECTIVE JAMMING OF NETWORK TRAFFIC IN CONTENTION-BASED NETWORKS

(75) Inventors: Troy D. Rockwood, Thousand Oaks, CA (US); Tamer A. ElBatt, Woodland Hills, CA (US); Jijun Yin, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 624 days.

(21) Appl. No.: 11/420,630

(22) Filed: May 26, 2006

(51) Int. Cl.
*H04J 1/16* (2006.01)
*H04L 12/26* (2006.01)

(52) U.S. Cl. ...................................... 370/235

(58) Field of Classification Search ....................... None
See application file for complete search history.

(56) References Cited

U.S. PATENT DOCUMENTS

| 5,841,778 | A | * | 11/1998 | Shaffer et al. ................ 370/447 |
| 2002/0129140 | A1 | * | 9/2002 | Peled et al. .................. 709/224 |
| 2008/0232335 | A1 | * | 9/2008 | Del Prado Pavon et al. . 370/338 |

\* cited by examiner

*Primary Examiner*—William Trost, IV
*Assistant Examiner*—Raj Jain
(74) *Attorney, Agent, or Firm*—Baker Botts L.L.P.

(57) ABSTRACT

According to one embodiment of the present invention, a method for selectively jamming network traffic includes monitoring data packets transmitted over a network. In response to the monitoring, the presence of a blocked signal is identified in a first data packet. Upon identification of the blocked signal, a second data packet is transmitted to interfere with the ability of one or more network nodes identified to receive the first data packet to decipher the first data packet.

26 Claims, 3 Drawing Sheets

SELECTIVE JAMMING OF NETWORK TRAFFIC IN CONTENTION-BASED NETWORKS

TECHNICAL FIELD

This invention relates generally to the field of communications and more specifically to selective jamming of network traffic in contention-based networks.

BACKGROUND

Contention-based networks allow devices to share network resources during the transmission of data packets. It may be desirable in some instances, however, to prevent the receipt of certain data packets when those data packets are determined to exhibit undesirable characteristics. For example, it may be desirable to prevent the receipt of data packets transmitted by a malicious node. As another example, it may be desirable to prevent the receipt of data packets that include malicious or unauthorized content (i.e., spam, porn, etc.).

To prevent the receipt of such data packets, network topology is typically altered such that data packets are transmitted through the network along pre-defined paths and/or through a single traffic concentration point. In the case of wireless networks, however, the alteration of network topology is generally ineffective in many instances to prevent the receipt of all undesirable data packets. This is generally true since no single node can be added to a wireless network to significantly increase the security of the network at large. Accordingly, defensive measures are taken on a per node basis, and expensive and complicated hardware and software alterations must be implemented at each node.

SUMMARY OF THE DISCLOSURE

In accordance with the present invention, disadvantages and problems associated with previous techniques for detecting anomalies may be reduced or eliminated.

According to one embodiment of the present invention, a method for selectively jamming network traffic includes monitoring data packets transmitted over a network. In response to the monitoring, the presence of a blocked signal is identified in a first data packet. Upon identification of the blocked signal, a second data packet is transmitted to interfere with the ability of one or more network nodes identified to receive the first data packet to decipher the first data packet.

Certain embodiments of the invention may provide one or more technical advantages. A technical advantage of one embodiment may be that a traffic monitoring device operates to selectively transmit a jam signal when a suspicious data transmission is detected. Since a jam signal is only sent when the suspicious transmission is detected, it is not necessary to proactively launch denial service attacks with respect to nodes known to transmit suspicious transmissions. Accordingly, a further technical advantage may be that legitimate traffic between network nodes is not hindered. Additionally, network resources directed at preventing malicious attacks are not wasted.

According to an embodiment implemented over a wireless network, the placement of special purpose nodes at locations proximate to a node transmitting suspicious content or at multiple designated locations in the wireless network eliminates the need for every transmitting and receiving node in the network to take on firewall and intrusion detection and prevention responsibilities for itself. As a result, a technical advantage may be that the security of the wireless network may be improved while the operation of the general nodes in the wireless network is unaffected. Still another technical advantage may be that the transmission of updates may be limited to special purpose nodes rather than all nodes in the wireless network. Such an advantage enables network administrators to respond to new threats in a very fast manner when compared with the odious task of updating the firewall mechanism in each and every wireless node in the network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
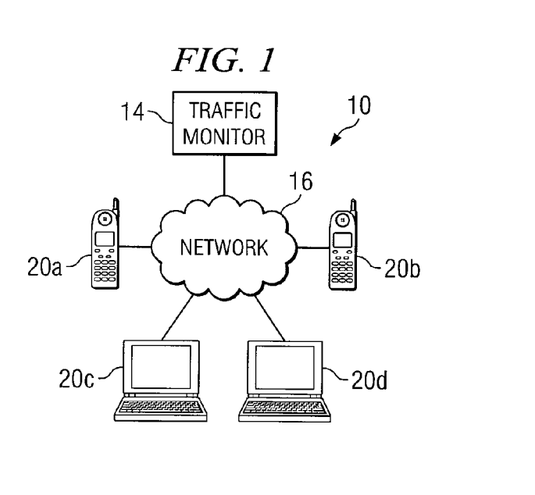
FIG. 1 is a block diagram of a network system that includes a traffic monitor operable to selectively jam network traffic, in accordance with one embodiment of the present invention.

FIG. 1 is a block diagram of one embodiment of a network system 10 that includes a traffic monitor 14 that operates to selectively block, or jam, network traffic such that receipt of the blocked signal by the intended recipient(s) is prevented. According to the embodiment, it is desirable in some instances to block network traffic on the basis of the type of content, the source of the content, or another factor related to the particular data packet. Because network traffic transmitted in some networks is not limited to defined traffic paths and may not easily be intercepted by a single network device such as a firewall, traffic monitor 14 is incorporated into network system 10 and operates to listen to traffic transmitted over network 16. When traffic monitor 14 identifies the transmission of a suspicious or otherwise prohibited data packet, traffic monitor 14 transmits a jam signal that will interfere with the ability of other nodes in network system 10 to decipher the suspicious data packet. As a result, the security of the network may be maintained on a network level.

According to the illustrated embodiment, network system 10 operates to provide services such as communication sessions to endpoints such as network nodes 20. In general, the communication session may include the transfer of information between two or more endpoints in network system 10.

Alternatively, the communication session may include the transfer of information to or from an endpoint external to network system 10 from/to an endpoint within network system 10. In either instance, the information communicated may include voice, data, text, audio, video, multimedia, control, signaling, other information, or any combination of the preceding.

Network system 10 includes components such as devices. In general, a device may include any suitable arrangement of components operable to perform the operations of the device, and may comprise logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, network system 10 includes one or more network nodes 20a-d, one or more networks 16, and a traffic monitoring point 14. Network nodes 20a-d represent any suitable device operable to receive and/or transmit information within a communication system. A network node 20 may comprise, for example, a computer such as a laptop, a server, a database, a wireless device, a voice communication device such as a telephone, or any other device operable to communicate with network system 10.

Network 16 represents a communication network that allows devices such as a network node 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

According to one embodiment, network 16 represents any suitable combination and arrangement of devices and transmission media supporting packet based communications. For example, network 16 may include any number of gateways, routers, switches, hubs, or repeaters interconnected to form an Ethernet subnet. A packet may comprise a bundle of data organized in a specific way for transmission, and a frame may comprise the payload of one or more packets organized in a specific way for transmission. Although a packet-based communication protocol such as Internet Protocol (IP) may be used to communicate the packets, other communication protocols are also within the scope of the present invention. Communication protocols and technologies that may be used by network system 10 to provide the communication sessions may include those set by the Institute of Electrical and Electronics Engineers, Inc. (IEEE), International Telecommunications Union (ITU-T), European Telecommunications Standards Institute (ETSI), Internet Engineering Task Force (IETF), or other organization.

According to one embodiment of operation, clients 20a-20d communicate and receive traffic via network 16. Thus, network 16 comprises a shared access contention based communication medium. An example of such a medium includes the electromagnetic spectrum which operates under carrier sense multiple access with collision avoidance (CSMA/CA) protocol as defined by the IEEE-802.11 standard. Another example includes the Ethernet which operates under carrier sense multiple access with collision detection (CSMA/CD) protocol as defined by the IEEE-802.3 standard.

In these and other such shared mediums, traffic monitor 14 operates to prevent the decryption of specific packets by the intended recipient or recipients. More specifically, traffic monitor 14 promiscuously listens to all network traffic transmitted via network 16 and identifies suspicious data packets. Traffic may refer to a packet flow of attempts, calls, messages, other types of packets, or any combination of the preceding. When a suspicious data packet is recognized, traffic monitor 14 switches to a transmit mode and transmits a data packet that interferes with the ability of other nodes on network 16 to decipher the suspicious data packet.

One or more components of network system 10 may operate on one or more computers and may include appropriate input devices, output devices, mass storage media, processors, memory, or other components for receiving, processing, storing, and communicating information according to the operation of network system 10. As used in this document, the term "computer" refers to any suitable device operable to accept input, process the input according to predefined rules, and produce output.

In particular embodiments, clients 20a-20d and other network devices communicating using network 16 operate in accordance with trust-based rules. In contention-based shared mediums such as network 16, for example, it is common for clients 20a-20d to adhere to trust-based rules that prohibit the clients 20a-20d from talking over one another. As will be described in more detail below, traffic monitor 14 may take advantage of the vulnerability that is created by these and other trust-based rules to result in increased security on network 16.

Modifications, additions, or omissions may be made to network system 10 without departing from the scope of the invention. The components of network system 10 may be integrated or separated according to particular needs. Moreover, the operations of network system 10 may be performed by more, fewer, or other modules. Additionally, operations of network system 10 may be performed using any suitable logic. As used in this document, "each" refers to each member of a set or each member of a subset of a set.

Figure 2:
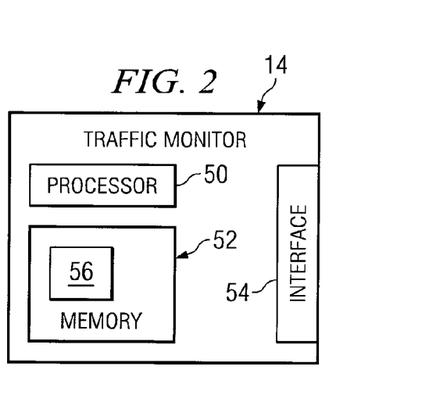
FIG. 2 is a block diagram of a traffic monitor that may be used with the network system of FIG. 1.

FIG. 2 is a block diagram of one embodiment of an traffic monitor 14 that may be used with the network system 10 of FIG. 1. As described above, traffic monitor 14 may use a set of criteria to detect suspicious data packets amongst network traffic transmitted via network 16. For the performance of these and other duties, traffic monitor 14 includes a processor 50, a memory 52, and an interface 54. Processor 50, memory 52, and interface 54 may be as described with reference to FIG. 1.

In particular embodiments, processor 50 may alternate between at least two modes of operation. For example, processor 50 may operate in a "listening" mode that enables processor 50 to listen to network traffic for the detection of suspicious packets. The ability to listen to network traffic is independent of whether or not the network traffic is addressed to or routed through traffic monitor 14. Thus, traffic monitor 14 intercepts all network traffic within transmission range of traffic monitor 14 regardless of the final destination of the network traffic. Accordingly, interface 54 may be provided to allow processor 50 to receive network traffic transmitted via network 16.

For the identification of suspicious packets, processor 50 may retrieve a set of criteria 56 from memory 52. In a particular embodiment, set of criteria 56 may include undesirable characteristics that are prohibited on network 16. In a particular embodiment, for example, set of criteria 56 includes a listing of pre-identified signals that are to be blocked by traffic monitor 14. Accordingly, set of criteria 56 may be said to include a listing of blocked signals or characteristics that may be found in those signals. In various embodiments, the blocked signals may include any data patterns or other information that may be detected in a network transmission and used to determine that a particular data packet transmitted via network 16 is suspicious and should be blocked.

Figure 3:
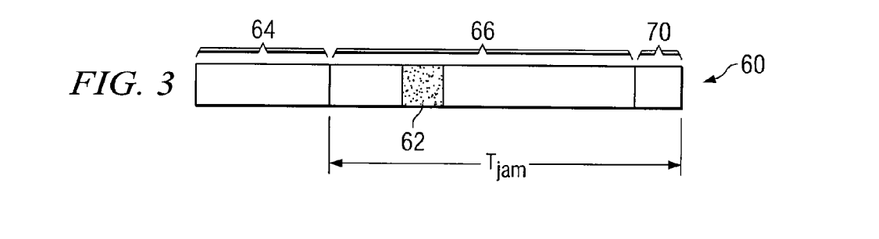
FIG. 3 illustrates a data packet containing a blocked signal, in accordance with various embodiments of the present invention.

An example of a data packet 60 that includes a blocked signal 62 is illustrated in FIG. 3. In general, data packet 60 of FIG. 3 includes at least two portions: a header portion 64 and a payload portion 66. Header portion 64 may include any information that is used in the processing and routing of data packet 60 by network 16 and components of network system 10. Header portion 64 of data packet 60 typically includes at least a source address and a destination address. Header portion 64 may also include instructions about the data carried by data packet 60. Such instructions may include but are not limited to the length of data packet 60, synchronization information, packet number (which packet data packet 60 is in a sequence of packets), and/or protocol information (when network 16 supports multiple protocols). By contrast, the payload portion 66 of data packet 60 is the body of the data packet. It includes the actual data that data packet 60 is delivering to the intended destination.

As stated above, blocked signal 62 includes any data pattern or other information that may be detected in a network transmission and used by traffic monitor 14 to determine that data packet 60 includes an undesirable characteristic and should be blocked. Although blocked signal 62 is illustrated as being included in the payload portion 66 of data packet 60, it will be recognized from the description below that blocked signal 62 may be present in header portion 64, payload portion 66, or any other portion of data packet 60.

In particular embodiments, for example, the set of criteria 56 used by traffic monitor 14 to identify a blocked signal 62 in data packet 60 may be source-based. Accordingly, blocked signal 62 may be included in the header portion 64 of data packet 60 and may correspond generally with the source address of data packet 60. For example, traffic monitor 14 may listen to all network traffic transmitted via network 16 and parse header portion 64 of each data packet 60 to determine the source address associated with each data packet. Traffic monitor 14 may then access set of criteria 56 stored in memory 52 to determine if the source address associated with each particular data packet 60 is identified as a blocked signal.

Additionally or alternatively, set of criteria 56 may be used to identify particular ports that are not authorized to receive content. For example, nodes 20a-d of network system 10 may not be authorized to receive web material transmitted to a particular port. In such an embodiment, traffic monitor 14 may parse header portion 64 to identify a destination port associated with a particular data packet. Where the destination port of a data packet is included as a blocked signal in set of criteria 56, traffic monitor 14 may operate to detect suspicious data packets that are directed to the identified port.

In other embodiments, set of criteria 56 used by traffic monitor 14 to identify a blocked signal 62 in data packet 60 may be content-based. Accordingly, the listing of blocked data in set of criteria 56 may include a list of terms that when identified in payload portion 66 of data packet 60 will result in the blocking of that data packet 60. Examples of such terms may include topics, such as pornography or non-business related topics, that users of end nodes 201-20d of network system 10 are not allowed to discuss via network 16. Thus, traffic monitor 14 may listen to network traffic transmitted via network 16 and parse payload portion 66 of each data packet 60 to identify the presence of blocked signal 62 in payload portion 66. As stated above, blocked signal 62 may exhibit some undesirable characteristics. For example, when a communication that includes pornography or other suspicious data content is detected, traffic monitor 14 may use set of criteria 56 to identify the presence of blocked signal 62 and take steps to prevent the receipt of data packet 60 containing blocked signal 62 by the intended recipient.

Whether traffic monitor 14 operates to identify blocked signals 62 on a content-basis, a source-basis, or some other basis, processor 50 transitions from a listening mode to a transmitting mode upon the detection of a blocked signal 62. The transmitting mode allows processor 50 to generate and transmit, via interface 54, a jam signal that will interfere with the ability of the intended recipient(s) of the data packet 60 including the blocked signal 62 to receive data packet 60. The transmission of the jam signal takes advantage of the vulnerability that is created by the recognition of and compliance with trust-based rules by network devices. For example, network nodes 20a-d may recognize the collision of the jam signal and the suspicious data packet 60 and automatically throw away both packets.

In order for the jam signal to successfully block suspicious data packet 60, processor 50 must transition into transmit mode and send the jam signal before the intended recipient(s) of suspicious data packet 60 have received and processed data packet 60. The time span, $T_{jam}$, is illustrated in FIG. 3A as reference numeral 68. $T_{jam}$ 68 represents the lapse in time between when block signal 62 of data packet 60 is sent by the source node and the instance in time when transmission of the data packet via network 16 is complete. Stated differently, traffic monitor 14 must begin talking over the suspicious data packet before transmission of the data packet is complete or within $T_{jam}$.

As shown in FIG. 3, $T_{jam}$ 68 includes the amount of time associated with the transmission of a check sum portion 70 of data packet 60. In particular embodiments, check sum portion 70 includes a cyclic redundancy check (CRC) such as Frame Check Sequence (FCS) as provided by the 802.11 Media Access Control (MAC) standard. Generally, the check sum portion 70 may include a numerical value based on the number of set bits in data packet 60. The receiving end node 20a-d uses a simple error detection scheme to apply the same formula to data packet 60 to calculate a numerical value. The receiving end node 20a-d then compares the calculated value with the value in check portion 70 to verify that the two are the same. If the calculated value is different from the value in check portion 70, the receiving node 20a-20d assumes that data packet 60 has been garbled.

In general, when two nodes on a network 16 are transmitting at the same time, the check portion of each of the overlapping signals will be wrong. When the check sum is wrong all receiving nodes operate to discard the data packets including the bad check portion. Accordingly, as long as traffic monitor 14 transmits the jam signal before the receipt of check portion 70 of data packet 60 by the receiving node 20a-d, traffic monitor 14 may successfully block receipt of the suspicious data packet 60 by the receiving node 20a-d. In reality, it is not necessary for the jam signal to interfere with the entire data packet 60. Rather, jam signal need only interfere with the receipt of check portion 70 of data packet 60 in order to render data packet 60 unreadable by the intended recipients. Thus, taking check portion 70 into account, $T_{jam}$ may be defined as the lapse in time between the detection of suspicious data packet 60 by traffic monitor 14 and the checking of the check portion 70 of data packet 60 by the receiving node 20*a-d*.

Returning to FIG. 2, modifications, additions, or omissions may be made to traffic monitor 14 without departing from the scope of the invention. Interface 54, processor 50, and memory 52 may be integrated or separated according to particular needs. For example, the present invention contemplates the functions of both processor 50 and memory 52 being provided using a single device. If processor 50 and memory 52 are separated, interface 54 may be coupled to processor 50 using a bus or other suitable link.

Moreover, the operations of traffic monitor 14 may be performed by more, fewer, or other modules. For example, the operations of processor 50 may be performed by one module. Additionally, operations of traffic monitor 14 may be performed using any suitable logic comprising software, hardware, other logic, or any suitable combination of the preceding.

The implementation of the described operations performed by traffic monitor 14 may be particular to the communication protocol employed and the particular medium used in network 16. In particular embodiments, the network may operate according to a protocol selected from the group consisting of Carrier Sense Multiple Access (CSMA), Carrier Sense Multiple Access/Collision Detection (CSMA/CD), Carrier Sense Multiple Access/Collision Avoidance (CSMA/CA), Time Division Multiple Access (TDMA), and Frequency Division Multiple Access (FDMA). For example, a classic CSMA/CD Ethernet system employs collision detection under the IEEE-802.3 specification. A carrier sense LAN considers all nodes 20*a-d* as peers. Thus, nodes 20*a-d* contend for the use of the channel on an equal basis. Before transmitting, nodes 20*a-d* monitor the channel to determine if the channel is active (that is, if another node is sending data on the channel). If the channel is idle, any node 20*a-d* with data to transmit can send its traffic onto the channel. If the channel is occupied, nodes 20*a-d* must defer to the node using the channel. Accordingly, nodes 20*a-d* must wait for the channel to become idle.

A network operating according to CSMA/CA protocol under the IEEE-802.11 specification operates similar to a classic Ethernet system. However, the 802.11 family of networks use a MAC layer employing collision avoidance. According to CSMA/CA, a node 20*a-d* that wants to transmit must first perform a request to send/clear to send (RTS/CTS) operation. Specifically, the node 20*a-d* desiring to transmit listens on the desired channel. If the channel is idle, the node 20*a-d* sends a RTS packet. In response to the RTS packet, a CTS packet allotting a time slice to the requesting node 20*a-d* is sent to all nodes 20*a-d* on the network. Each node 20*a-d* then reserves the allotted time slice for transmission by requesting node 20*a-d*.

A network operating according to Time Division Multiple Access (TDMA) protocol operates similar to the CSMA/CA systems. Specifically, TDMA provides a technology for delivering wireless service using time-division multiplexing (TDM). TDMA works by dividing a radio frequency into time slots and then allocating slots to multiple calls. In this way, a single frequency can support multiple, simultaneous data channels. TDMA is used by the GSM digital cellular system.

The protocols described above are but a few of the communication protocols that may be used by network 16. The described functions of traffic monitor 14 may be applied to any protocol based on these or other protocols. Accordingly, in particular embodiments, traffic monitor 14 may perform operations similar to those described above to improve security in a network 16 operating under CDMA, Frequency Division Multiple Access (FDMA), Frequency Hopping Spread Spectrum (FHSS), and other medium access control protocols.

Figure 4:
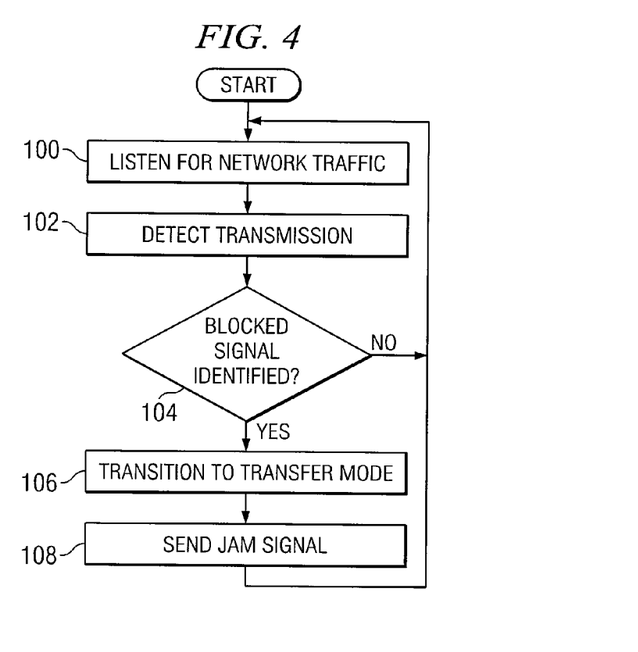
FIG. 4 is a flowchart of one embodiment of a method for selectively jamming network traffic, in accordance with one embodiment of the present invention.

FIG. 4 is a flowchart of one embodiment of a method for jamming suspicious traffic within a network 16. The method of FIG. 4 may be employed by a traffic monitor 14 operating under any of the above described communication protocols. The method begins at step 100, by listening for network traffic. In particular embodiments, traffic monitor 14 may listen for a transmission of data packets, such as data packet 60 described above with respect to FIG. 3. As described above, all network traffic within transmission range of traffic monitor 14 may be monitored regardless of the addressee(s) of the transmission. Accordingly, traffic monitor 14 may be said to promiscuously listen to network traffic.

At step 102, a transmission is detected. In response to the detection, traffic monitor 14 determines if the transmission includes a blocked signal. In particular embodiments, for example, traffic monitor 14 may access a set of criteria 56 that includes a listing of blocked signals. Traffic monitor 14 may compare data in or characteristics of the transmission to set of criteria 56 to determine if the transmission should be blocked. In particular embodiments, traffic monitor 14 may determine whether the identified transmission includes a source-based blocked signal. For example, traffic monitor 14 may compare the source address of the transmission with set of criteria 56 to determine whether traffic from the source of the transmission is identified in set of criteria 56 as a blocked signal.

Additionally or alternatively, traffic monitor 14 may determine whether the identified transmission includes a content-based blocked signal, in particular embodiments. Specifically, traffic monitor 14 may parse the content of the transmission to determine if the subject matter of the transmission includes a blocked signal identified by set of criteria 56. For example, data in the payload portion of the transmission may be compared with set of criteria 56 to determine if the transmission contains suspicious or prohibited content.

If traffic monitor 14 determines that the transmission does not include a blocked signal, the method returns to step 100, and traffic monitor 14 continues to listen for network traffic. Conversely, if traffic monitor 14 determines that the transmission includes a blocked signal, the method continues to step 106, and traffic monitor 14 transitions into a transmit mode. Following the transition into transmit mode, a jam signal is immediately transmitted to interfere with the transmission at step 108. In a particular embodiment, the jam signal is received by addressees of the transmission at any time prior to the completed transmission of the original data packet. As a result of the transmission, nodes 20*a-d* in network 16 may detect the collision of the jam signal with the original transmission and discard both signals. In particular embodiments, the collision of the jam signal and the original transmission may cause a check sum portion of the transmission to be wrong. As a result, receiving nodes 20*a-d* may operate to automatically discard the original transmission.

Figure 5:
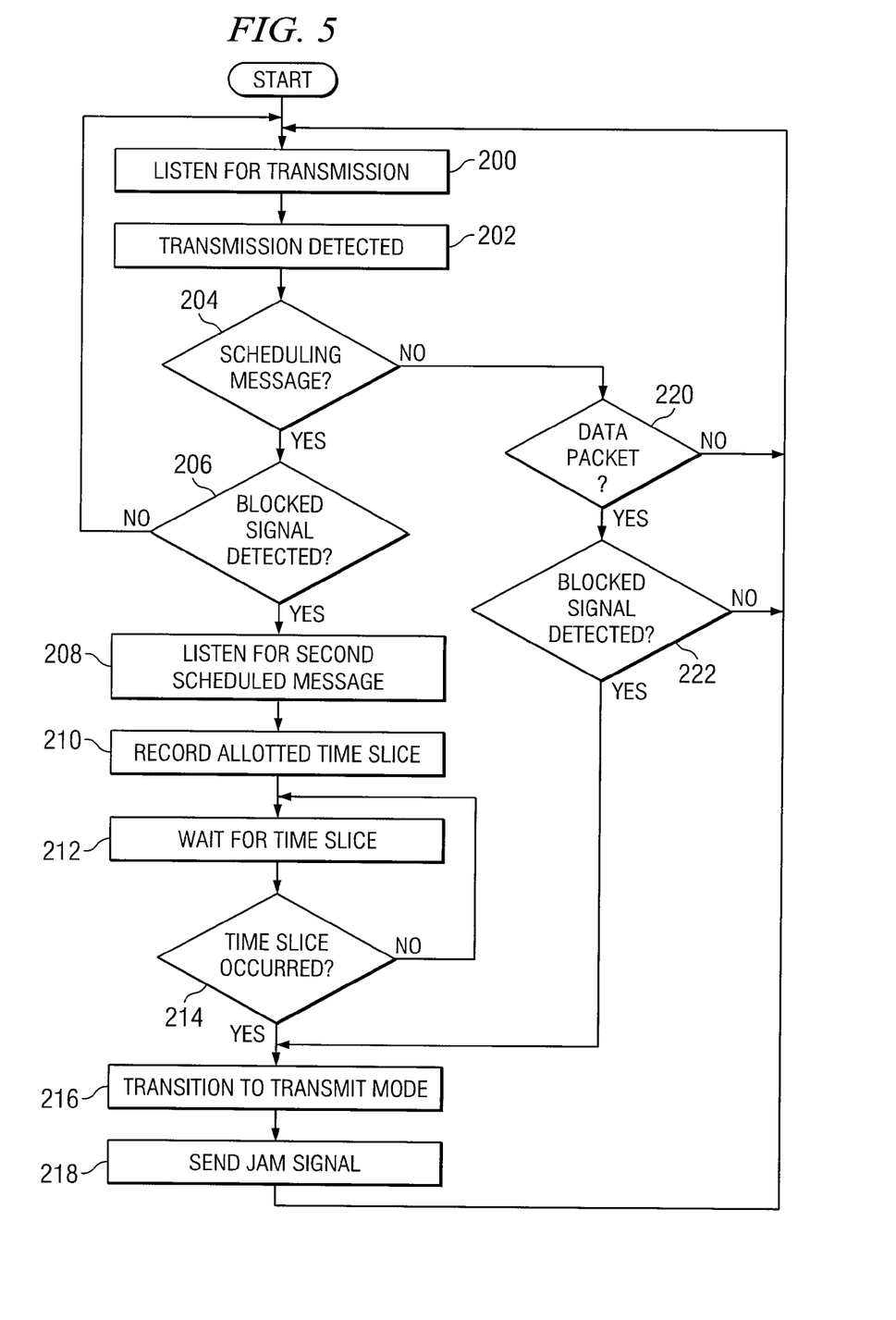
FIG. 5 is a flowchart of another embodiment of a method for selectively jamming network traffic, in accordance with one embodiment of the present invention.

FIG. 5 is a flowchart of another embodiment of a method for jamming suspicious traffic within a network 16. The method of FIG. 5 may be employed by a traffic monitor 14 operating communication protocols that utilize RTS/CTS (i.e., CSMA/CA) or any other transmission scheduling mechanism. The method begins at step 200 by listening to network traffic. Similar to the method of FIG. 4, all network traffic within transmission range of a monitoring device may be monitored regardless of the addressee(s) of the transmission. Accordingly, the monitoring device, such as traffic monitor 14, may be said to promiscuously listen to network traffic.

At step 202, a transmission is detected. In response to the detection, a determination is made at step 204 as to whether the transmission is a RTS message or other scheduling message. If the message is a scheduling message, a further determination is made at step 206 to determine if the scheduling message includes a blocked signal. In particular embodiments, for example, a set of criteria 56 may be accessed. If the source of the transmission is not identified in the set of criteria 56 as a blocked source of network traffic, a blocked signal is not detected at step 206. The method then returns to step 200 for further monitoring of network transmission for a transmission.

Conversely, if the source of the transmission is identified in the set of criteria 56 as a blocked source of network traffic, a blocked signal is detected at step 206 and the method continues to step 208, where network traffic is monitored for a second scheduling message. In particular embodiments, the second scheduling message may include a CTS message that identifies a time slice allotted for a subsequent transmission by the requesting node 20a-d. When the second scheduling message is detected, the time slice provided in the second scheduling message is recorded by the monitoring device at step 210. In particular embodiments, recording the allotted time slice may include updating a table of scheduled data transmissions.

At step 212, the monitoring device waits for the occurrence of the allotted time slice. A determination is made at step 214 as to whether the time slice has occurred. If it has not, the method returns to step 212 and traffic monitor 14 continues to wait until the time associated with time slice occurs. Once the time slice has occurred, the method continues to step 216, where traffic monitor 14 transitions into a transmit mode.

At step 218, a jam signal is transmitted to interfere with the transmission identified in step 206. In a particular embodiment, for example, traffic monitor 14 immediately sends the jam signal such that the jam signal is received before the transmission of the suspicious data is complete. The method then returns to step 200, and the monitoring device continues to listen for network traffic containing blocked signals.

Returning now to steps 204, if it is determined that the detected transmission is not a scheduling message, the method proceeds to step 220. A determination is made at step 220 as to whether the transmission includes a data packet, such as data packet 60. If the transmission does not include a data packet, the method may return to step 200, where the monitoring device may continue to monitor network traffic.

Conversely, if it is determined that the transmission does include a data packet at step 220, the method may proceed to step 222, and a determination may be made as to whether the transmission includes a blocked signal. In particular embodiments, the monitoring device, such as traffic monitor 14, may determine whether the identified transmission includes a content-based blocked signal. Specifically, the content of the transmission may be parsed to determine if the subject matter of the transmission includes a blocked signal identified in set of criteria 56. For example, data in the payload portion of the transmission may be compared with set of criteria 56 to determine if the transmission contains suspicious or prohibited content.

If traffic monitor 14 determines that the transmission does not include a blocked signal, the method returns to step 200, and traffic monitor 14 continues to listen for network traffic. Conversely, if it is determined that the transmission includes a blocked signal, the method continues to step 216, and the monitoring device transitions into a transmit mode. The method then continues to step 218, where a jam signal similar to that described above is sent.

In a particular embodiment, the jam signal is received by addressees of the transmission at any time during the transmission of, but prior to the completed transmission of the original data packet. As a result of the transmission, nodes 20a-d in network 16 may detect the collision of the jam signal with the original transmission and discard both. In particular embodiments, the collision of the jam signal and the original transmission may cause a check sum portion of the transmission to be wrong. As a result, receiving nodes 20a-d may operate to automatically discard the original transmission.

The method illustrated in FIG. 5, allows for the identification of blocked signals on a content-basis, a source-basis, or both. Specifically, step 206 allows for source-based identification of blocked signals where the message detected is a scheduling message such as a RTS. For example, where a RTS message initiates at a node that is identified as a suspicious node, the outcome of step 206 will result in the subsequent data transmission associated with the RTS message being blocked by the monitoring device. The monitoring device will wait for the allotted time slice to occur and automatically block the data packet transmitted from this suspicious node based on the source-based detection of the RTS. Thus, it is not necessary to analyze the subsequent data transmission that is associated with the RTS to determine whether the data transmission should be blocked. The determination to block the signal has already been made by the monitoring device.

It is anticipated that there may be instances where a data transmission containing suspicious content is generated from a node that is not identified in set of criteria 56 as a source of suspicious content. As a result, a RTS message detected at step 204 may not be identified as step 206 as including a blocked signal. When the subsequent data packet is transmitted by the transmitting node, however, the data packet may be detected at step 220 and then parsed to determine if the data packet includes suspicious content. In this manner, step 222 may be used to identify suspicious content when the source of the content is otherwise determined to be trustworthy.

Modifications, additions, or omissions may be made to the methods of FIGS. 4 and 5 without departing from the scope of the invention. The methods may include more, fewer, or other steps. Additionally, steps may be performed in any suitable order without departing from the scope of the invention.

As one possible modification that may be applied to either of the methods of FIG. 4 and FIG. 5, it is recognized that when a transmission containing suspicious content is detected, the source of the data transmission may then be identified as a source of unauthorized content. Accordingly, traffic monitor 14 may revise set of criteria 56 to include the source address of the suspicious data transmission. As a result of the inclusion of the source address in set of criteria 56, subsequent data transmissions from the source node may be blocked. The blocking may be applied to only the next data transmission from the offending source. Alternatively, the blocking may be applied to all data transmissions from the offending source.

The success of traffic monitor 14 in jamming suspicious data packets and the methods described above may depend upon the physical topology of network 16. For example, in a wireless network, some nodes 20a-20d may be within the transmission range of the node transmitting the suspicious data packet but outside the transmission range of traffic monitor 14. Thus, the node may not receive the jam signal and may, as a result, decipher the suspicious data packet as if the jam signal was not transmitted at all.

Figure 6A:
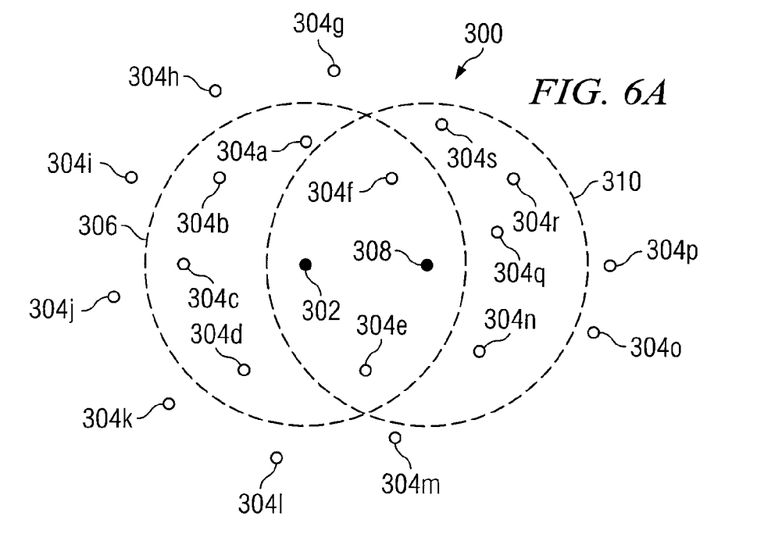
FIGS. 6A and 6B illustrate the use of a special purpose node, such as a traffic monitor, for combating the hidden node problem.

The "hidden node problem" is illustrated in the wireless network 300 of FIG. 6A. Specifically, wireless network 300 includes a suspect node 302 that transmits wireless data transmissions to one or more other nodes 304*a-s* in wireless network 300. To receive a transmission from suspect node 302, a node must be within a transmission range 306 of suspect node 302. In the illustrated embodiment, nodes 304*a-f* are within transmission range 306 of suspect node 302. Because nodes 304*g-s* are outside transmission range 306, nodes 304*g-s* will not receive transmissions sent from suspect node 302.

To prevent the receipt by nodes 304*a-f* of suspicious data content from suspect node 302, a special purpose node 308 is placed in wireless network 300. In particular embodiments, special purpose node 308 includes a traffic monitor, such as traffic monitor 14 described above with regard to FIGS. 2 and 3. Thus, special purpose node 308 may operate to listen to network traffic for the detection of data transmissions from suspect node 302. When special purpose node 308 detects a transmission, special purpose node 308 may immediately or within an appropriate time frame transition into a transmit mode. Special purpose node 308 may then transmit a jam signal that interferes with the ability of nodes 304*a-f* to decipher the content of the suspicious data transmission by suspect node 302.

Figure 6B:
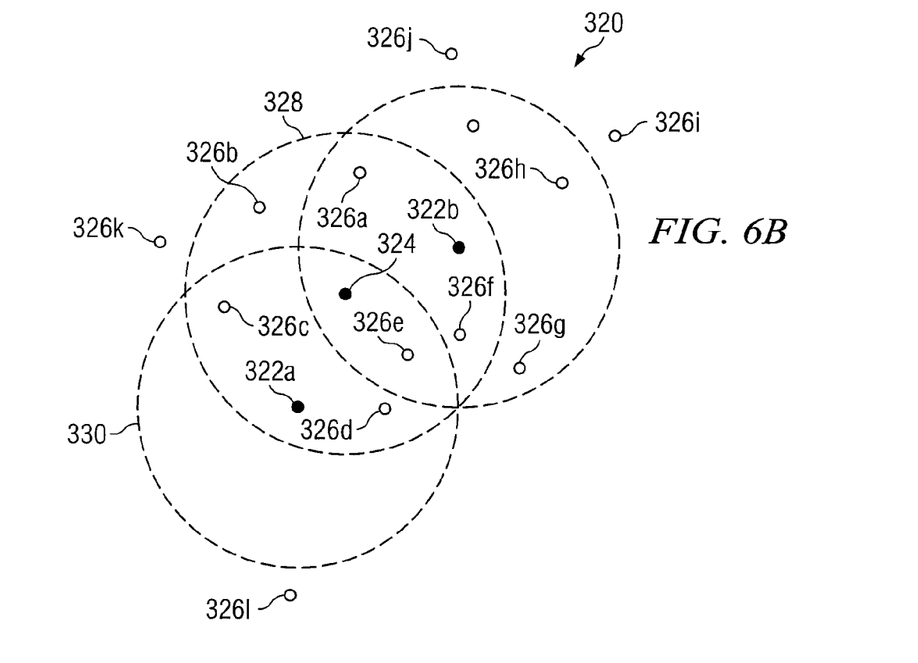

Like suspect node 302, messages transmitted by special purpose node 308 are only received by nodes within an identified transmission range 310. The closer special purpose node 308 is to suspect node 302, the closer the transmission ranges associated with special purpose node 308 and suspect node 302 overlap. Thus, if the location of suspect node 302 is known, special purpose node 308 should be placed as close to suspect node 302 as possible. In the illustrated embodiment, however, only nodes 304*e-f*, 304*n*, and 304*q-s* are within transmission range 310 of special purpose node 308. As a result, nodes 304*a-d* are able to receive transmissions from suspect node 302 but are not able to receive transmissions from special purpose node 308. Accordingly, nodes 304*a-d* are considered hidden nodes with respect to special purpose node 308.

Where the location of suspect node 302 is not known or where the location of suspect node 302 varies over time, it is desirable to place multiple special purpose nodes within the wireless network. FIG. 6B illustrates a wireless network 320 that includes multiple special purpose nodes 322*a-b* strategically placed at particular locations within the network 320 to increase security of the network 320.

As illustrated, wireless network 320 includes a suspect node 324 that transmits wireless data transmissions to one or more other nodes 326*a-f* within a transmission range 328 of suspect node 324. Nodes 326*g-l*, which are outside transmission range 328, will not receive transmissions sent from suspect node 324.

To prevent the receipt of suspicious data content by nodes 304*a-f* within transmission range 328 of suspect node 324, multiple special purpose nodes 322*a-b* are placed in wireless network 320. In particular embodiments, special purpose nodes 322*a-b* may operate similar to traffic monitor 14 of FIGS. 1-2 and, thus, may listen to network traffic for the detection of data transmissions from suspect node 324. When a special purpose node 322*a* or 322*b* detects a transmission by suspect node 324, the special purpose node 322*a* or 322*b* detecting the suspicious transmission may immediately or within an appropriate time frame transition into a transmit mode. The special purpose node may then transmit a jam signal that interferes with the ability of nodes 304*a-f* to decipher the content of the suspicious data transmission by suspect node 302.

As illustrated, a transmission range 330 of first special purpose node 322*a* overlaps with transmission range 328 of suspect node 324 only to the extent that nodes 326*c*, 326*d*, and 326*e* are within a common transmission range of suspect node 324. Accordingly, when first special purpose node 322*a* detects the transmission of a suspicious data packet by suspect node 324 and sends a jam signal to interfere with the suspicious data packet, only nodes 326*c*, 326*d*, and 326*e* will receive the jam signal sent by first special purpose node 322*a*. The remaining nodes within transmission range 328 of suspect node 324 may receive a jam signal sent by second special purpose node 322*b* or another special purpose node (not shown).

In the illustrated embodiment, for example, when first special purpose node 322*a* detects the transmission of a suspicious data packet by suspect node 324, second special purpose node 322*b* detects the same suspicious data packet. In response to the detection, special purpose node 322*b* also sends a jam signal to interfere with the suspicious data packet. Those nodes within transmission range of second special purpose node 322*b* receive the jam signal and, as a result, are unable to decipher the suspicious data packet. Thus, nodes 326*a*, 326*f*, and 326*e* will receive the jam signal transmitted by second special purpose node 322*b*.

From the description is may be noted that some nodes that are within transmission range of two or more special purposes nodes will receive multiple jam signals in response to a single suspicious data packet. An example of such a node in the illustrated embodiment, includes node 326*e*. Whether node 326*e* receives one jam signal or multiple jam signals does not effect the outcome. In either instance, node 326*e* identifies the collision of the suspicious data packet with the one or more jam signals and discards all packets without deciphering them.

Like the embodiments described above, special purpose nodes 322*a-b* selectively jam data packets determined to be suspicious on either a content-basis or a source basis. In a sense, each special purpose node 322*a-b* operates as a wireless firewall. Because multiple special purpose nodes 322*a-b* are dispersed through network, it is not necessary for all wireless traffic to pass through a single special purpose node. Rather, because suspicious data traffic from suspect node 324 is jammed upon transmission by one or more of the special purposes nodes within transmission range 328 of suspect node 324, suspect node 324 is effectively denied access to wireless network by special purpose nodes 322*a-b* who continuously and promiscuously monitor all network traffic within hearing range.

To increase the efficiency of each special purpose node 322*a-b*, the transmission ranges of special purpose nodes 322*a-b* should be maximized. Transmission ranges are determined by radio transmission power and minimum data rate requirements. In particular embodiments, for example, where wireless network 320 is operating under the IEEE-802.11 protocol, special purpose nodes 322*a-b* should have a transmission power on the order of 100 mw and a minimum data rate on the order of 1 Mbps to maximize the transmission ranges associated with special purpose nodes 322*a-b*.

The placement of special purpose nodes 322*a-b* at multiple places in network 320 eliminates the need for each node 326*a-l* to take on firewall and intrusion detection and prevention responsibilities for itself. As a result, the operation of nodes 326a-l in wireless network 320 is unaffected. Furthermore, the transmission of updates to set of criteria 56 may be limited to special purpose nodes 322a-b rather than all nodes 326a-l in wireless network 320. This enables network administrators to respond to new threats in a very fast manner when compared with the odious task of updating the firewall mechanism in each and every wireless node 326a-l in network 320.

Additionally, since jamming signals are only sent when a transmission from suspect node 324 is detected, it is not necessary to proactively launch denial service attacks with respect to suspect node 324. Accordingly, legitimate traffic between nodes 326a-l is not hindered and network resources directed at preventing malicious attacks by suspect node 324 are not wasted.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for selectively jamming network traffic, comprising:
   monitoring data packets transmitted over a network;
   identifying a suspect node that is a source of one or more suspicious data packets;
   in response to identifying the suspect node, positioning a special purpose node proximate to the suspect node that is the source of the one or more suspicious data packets, the special purpose node positioned such that a transmission range of the special purpose node substantially overlaps a transmission range of the suspect node;
   in response to the monitoring and positioning, identifying a presence of a blocked signal in a first data packet transmitted from the suspect node; and
   upon identification of the blocked signal, transmitting a second data packet to interfere with an ability of one or more network nodes identified to receive the first data packet to decipher the first data packet.

2. The method of claim 1, wherein monitoring data packets comprises providing a traffic monitor on the network, the traffic monitor operable to listen to network traffic regardless of the addressees identified to receive the network traffic.

3. The method of claim 1, wherein the network operates according to a protocol selected from the group consisting of Carrier Sense Multiple Access (CSMA), Carrier Sense Multiple Access/Collision Detection (CSMA/CD), Carrier Sense Multiple Access/Collision Avoidance (CSMA/CA), Time Division Multiple Access (TDMA), and Frequency Division Multiple Access (FDMA).

4. The method of claim 1, wherein the network comprises a wireless network and the one or more nodes comprise one or more wireless nodes, and wherein the at least one special purpose node is provided on the wireless network to listen to network traffic.

5. The method of claim 4, wherein providing the at least one special purpose node comprises positioning a plurality of special purposes nodes at disparate locations on the network, a transmission range of each special purpose node overlapping a portion of a transmission range of a suspect node that is the source of the first data packet.

6. The method of claim 1, wherein identifying the presence of the blocked signal comprises:
   accessing a set of criteria comprising a list of source addresses from which data packets are unauthorized;
   identifying a source address associated with the first data packet; and
   determining that the source address associated with the first data packet is listed in the set of criteria.

7. The method of claim 1, wherein identifying the presence of the blocked signal comprises:
   accessing a set of criteria comprising a list of data content items that are unauthorized; and
   parsing the first data packet to identify at least one data content item from the list of data content items that is present in the first data packet.

8. The method of claim 1, wherein each data packet is comprised of a plurality of fields of data and identifying the blocked signal comprises identifying the presence of an undesirable characteristic with one or more fields of the first data packet.

9. The method of claim 1, wherein the transmission of the second data packet causes a check portion of the first data packet to be wrong.

10. The method of claim 1, wherein identifying the suspect node that is the source of one or more suspicious data packets comprises identifying a request to send message from the source, the request to send scheduling the transmission of the blocked first data packet.

11. The method of claim 10, wherein the request to send identifies a time slice during which the first data packet will be transmitted, and wherein identifying the suspect node further comprises:
   waiting for the occurrence of the time slice; and
   upon the occurrence of the time slice, transmitting the second data packet to interfere with the ability of one or more network nodes identified to receive the first data packet to decipher the first data packet.

12. The method of claim 10, wherein identifying the suspect node further comprises:
   determining that the source of the one or more suspicious data packets is a blocked source.

13. A traffic monitor operable to selectively jam suspicious data content, comprising:
   an interface operable to receive and transmit data packets over a network;
   a memory operable to store a set of criteria;
   a processor coupled to the memory and the interface, the processor operable to:
      monitor data packets transmitted over a network;
      identify a suspect node that is a source of one or more suspicious data packets;
      in response to identifying the suspect node, position a special purpose node proximate to the suspect node that is the source of the one or more suspicious data packets, the special purpose node positioned such that a transmission range of the special purpose node substantially overlaps a transmission range of the suspect node;
      in response to the monitoring and positioning, access the set of criteria to identify a presence of a blocked signal within a first data packet transmitted from the suspect node; and
      upon identification of the blocked signal, transmit a second data packet over the network to interfere with an ability of one or more network nodes identified to receive the first data packet to decipher the first data packet.

14. The traffic monitor of claim 13, wherein the processor is operable to listen to data packets transmitted over the network regardless of the addressees identified to receive the network traffic.

15. The traffic monitor of claim 13, wherein the network operates according to a protocol selected from the group consisting of Carrier Sense Multiple Access (CSMA), Carrier Sense Multiple Access/Collision Detection (CSMA/CD), Carrier Sense Multiple Access/Collision Avoidance (CSMA/CA), Time Division Multiple Access (TDMA), and Frequency Division Multiple Access (FDMA).

16. The traffic monitor of claim 13, wherein the processor is operable to identify the presence of the blocked signal by:
   accessing the set of criteria, the set of criteria comprising a list of source addresses from which data packets are unauthorized;
   identifying a source address associated with the first data packet; and
   determining that the source address associated with the first data packet is listed in the set of criteria.

17. The traffic monitor of claim 13, wherein the processor is operable to identify the presence of the blocked signal by:
   accessing the set of criteria comprising a list of data content items that are unauthorized; and
   parsing the first data packet to identify at least one data content item from the list of data content items that is present in the first data packet.

18. The traffic monitor of claim 13, wherein each data packet is comprised of a plurality of fields of data and the processor is operable to identify the blocked signal by identifying the presence of an undesirable characteristic with one or more fields of the first data packet.

19. A system for selectively jamming suspicious data content transmitted over a wireless network, comprising:
   a wireless network for the transmission of data packets between a plurality of wireless nodes;
   a first node operable to transmit a first data packet over the wireless network;
   a second node positioned proximate the first node such that a transmission range of the second node substantially overlaps a transmission range of the first node, the position of the second node relative to the first node selected in response to determining that first node is a source of one or more suspicious data packets, the second node operable to intercept the first data packet transmitted over the wireless network, the second node further operable to:
      identify a presence of a blocked signal within the first data packet; and
      upon identification of the blocked signal, transmit a second data packet to interfere with an ability of one or more wireless nodes identified to receive the first data packet to decipher the first data packet.

20. The system of claim 19, further comprising a third node, the second and third nodes comprising special purpose nodes positioned at disparate locations on the wireless network, a transmission range of each of the second and third nodes overlapping a portion of a transmission range of the first node.

21. A computer readable storage media encoded with computer executable instructions, executed by a processor operable to:
   monitor data packets transmitted over a network;
   identify a suspect node that is a source of one or more suspicious data packets;
   in response to identifying the suspect node, positioning a special purpose node proximate to the suspect node that is the source of the one or more suspicious data packets, the special purpose node positioned such that a transmission range of the special purpose node substantially overlaps a transmission range of the suspect node;
   in response to the monitoring and positioning, identifying a presence of a blocked signal in a first data packet transmitted from the suspect node; and
   upon identification of the blocked signal, cause a second data packet to be transmitted, the transmission of the second data packet operable to interfere with an ability of one or more network nodes identified to receive the first data packet to decipher the first data packet.

22. The computer readable storage media of claim 21, wherein when monitoring data packets the logic is operable to listen to network traffic regardless of the addressees identified to receive the network traffic.

23. The computer readable storage media of claim 21, wherein the network operates according to a protocol selected from the group consisting of Carrier Sense Multiple Access (CSMA), Carrier Sense Multiple Access/Collision Detection (CSMA/CD), Carrier Sense Multiple Access/Collision Avoidance (CSMA/CA), Time Division Multiple Access (TDMA), and Frequency Division Multiple Access (FDMA).

24. The computer readable storage media of claim 21, wherein the network comprises a wireless network and the one or more nodes comprise one or more wireless nodes. b-1

25. The computer readable storage media of claim 21, wherein when identifying the presence of the blocked signal the logic is operable to: access a set of criteria comprising a list of source addresses from which data packets are unauthorized; identify a source address associated with the first data packet; and determine that the source address associated with the first data packet is listed in the set of criteria.

26. The computer readable storage media of claim 21, wherein when identifying the presence of the blocked signal the logic is operable to:
   access a set of criteria comprising a list of data content items that are unauthorized; and
   parse the first data packet to identify at least one data content item from the list of data content items that is present in the first data packet.

* * * * *

UNITED STATES PATENT AND TRADEMARK OFFICE
CERTIFICATE OF CORRECTION

| | | |
|---|---|---|
| PATENT NO. | : 7,656,801 B1 | Page 1 of 1 |
| APPLICATION NO. | : 11/420630 | |
| DATED | : February 2, 2010 | |
| INVENTOR(S) | : Troy D. Rockwood et al. | |

It is certified that error appears in the above-identified patent and that said Letters Patent is hereby corrected as shown below:

Column 16:
Line 35, Claim 24, after "nodes" please delete "b-1."

Signed and Sealed this
First Day of November, 2011

David J. Kappos
*Director of the United States Patent and Trademark Office*